US005793137A

United States Patent [19]

Smith

[11] Patent Number: 5,793,137
[45] Date of Patent: Aug. 11, 1998

[54] ELECTRICAL POWER GENERATORS

[75] Inventor: James Andrew Timothy Smith, Grantham, Great Britain

[73] Assignee: Ultra Electronics, Limited, Bristol, United Kingdom

[21] Appl. No.: 844,025

[22] Filed: Apr. 18, 1997

Related U.S. Application Data

[63] Continuation of Ser. No. 295,810, filed as PCT/GB93/00455, Mar. 4, 1993, published as WO93/18571, Sep. 16, 1993, abandoned.

[30] Foreign Application Priority Data

Mar. 4, 1992 [GB] United Kingdom ............... 9204888
Feb. 26, 1993 [GB] United Kingdom ............... 9303623

[51] Int. Cl.$^6$ .................. H02K 16/00; H02K 16/04; H02K 1/27; H02K 7/18
[52] U.S. Cl. ................ 310/114; 310/67 R; 310/268
[58] Field of Search ................ 310/67 R, 112, 310/114, 115, 184, 268; 322/46

[56] References Cited

U.S. PATENT DOCUMENTS

| | | | |
|---|---|---|---|
| 1,491,441 | 4/1924 | Thomson | 310/114 |
| 2,444,557 | 7/1948 | Eaton | 310/67 R |
| 2,446,663 | 8/1948 | Palmatier | 310/67 R |
| 2,903,641 | 9/1959 | Roe | 310/115 |
| 3,109,114 | 10/1963 | Baudot | 310/268 |
| 4,410,794 | 10/1983 | Williams | 323/319 |
| 4,447,737 | 5/1984 | Cronin | 310/114 |
| 4,550,267 | 10/1985 | Vaidya | 310/184 |
| 4,996,457 | 2/1991 | Hawsey et al. | 310/268 |
| 5,229,677 | 7/1993 | Dade et al. | 310/268 |

FOREIGN PATENT DOCUMENTS

| | | |
|---|---|---|
| 1249849 | 11/1960 | France . |
| 2147527 | 3/1972 | Germany . |

*Primary Examiner*—Clayton E. LaBalle
*Attorney, Agent, or Firm*—Jones & Askew

[57] ABSTRACT

An electrical generator (1) comprising first and second relatively rotatable winding assemblies (5,8), the first winding assembly (5) having a first electrical output for connection to a first electrical load (4) and the second winding assembly (8) having a second electrical output for connection to a second electrical load (6 or 19), and a permanent magnet assembly (12) freely rotatably mounted between the winding assemblies (5,8) such that, in use, rotation of the winding assemblies (5,8) relative to the permanent magnet (12) assembly induces a current in both winding assemblies. A third winding assembly (19) may rotate with the second winding assembly (8) relative to a fourth winding assembly (20) that rotates into the first winding assembly (5). The third winding assembly 19, may comprise said second electrical load, and the fourth winding assembly (20) may be connected to a fourth electrical load (22,23). The first and fourth electrical loads (4,22,23) may be de-icing elements on a propeller.

12 Claims, 5 Drawing Sheets

5,793,137

1

ELECTRICAL POWER GENERATORS

This is a continuation of application No. 08/295,810, filed as PCT/GB93/00455, Mar. 4, 1993, published as WO93/18571, Sep. 16, 1993, now abandoned.

TECHNICAL FIELD

This invention relates to electrical power generators, particularly, but not exclusively, for providing electrical power for aircraft.

It is known to produce an electrical current by causing relative movement of a magnet and coil. FR 2281273 discloses the use of the generated current to electrically heat propeller blades. A problem with such an arrangement is that a separate generator is required to provide power for other aircraft functions such as airframe deicing.

DISCLOSURE OF THE INVENTION

It is an object of the invention to provide an electrical power generator having at least two power outputs.

Accordingly, the invention consists in an electrical generator comprising first and second relatively rotatable winding assemblies, the first winding assembly having a first electrical output for connection to a first electrical load and the second winding assembly having a second electrical output for connection to a second electrical load, and a permanent magnet assembly freely rotatably mounted between the winding assemblies such that, in use, relative motion of the winding assemblies induces a current in both winding assemblies.

By making the magnet assembly freely rotatable it tends to follow one of the winding assemblies say the first, for example, inducing a current in the second assembly. The induced current produces a field which opposes the field producing it, causing a force which tends to rotate the magnet assembly in the opposite direction to that of the first winding assembly. This causes the magnet assembly to lag with respect to the first winding assembly and the relative motion therebetween causes a current to be induced in the first winding assembly.

The use of such a generator is particularly advantageous in an aircraft where the second winding assembly may be fixed to the airframe and the firs t winding assembly fixed to a propeller hub. The magnet assembly is t hen freely rotatably mounted about the propeller shaft. With such an arrangement, blade heater elements may be connected to the first winding assembly and airframe de-icing elements to the second winding assembly. This is particularly advantageous since one generator can drive both de-icing elements.

Whilst it may be possible on multi-engined aircraft for the second winding to be connected via slip-ring arrangements to the de-icing elements on the blades of the other propellers, it will be more convenient for each engine to have an associated generator since slip-rings require careful and time consuming maintenance if they are to function properly.

The electrical output of the second winding assembly may be used to induce a current in a further winding assembly that rotates with the first winding assembly so that the first and further winding assemblies each produce a separate electrical output on the one rotating assembly, which if it is a propeller, then has two electrical outputs to power separate de-icing elements and/or anti-icing elements. Generally an anti-icing element requires continuous power and a de-icing element only requires pulsed power. The blades of the propeller can therefore be de-iced by switching one electrical output between respective de-icing elements associated with the blades. Power switching can be achieved either by using electrical switching means or by providing the further winding assembly as multiple separate winding assemblies, each connected to respective de-icing elements, and each excited in succession by the second winding assembly.

Preferably, the generator includes a controller for varying the first or second load. By varying the load the power through both loads is controlled.

The windings may be formed from wire wound about a former or, preferably, take the form of printed electrically conducting tracks on a top and bottom surface of a planar substrate, ends of the tracks being preferably linked by through hole plating to produce a coil.

Preferably, the windings are mounted on a material which concentrates magnetic flux. Such materials include soft iron and nodynium and alloys of such material.

DESCRIPTION OF THE DRAWINGS

A specific embodiment of the invention will now be described, by way of example only, with reference to the drawing in which.

MODE OF CARRYING OUT THE INVENTION

Figure 1:
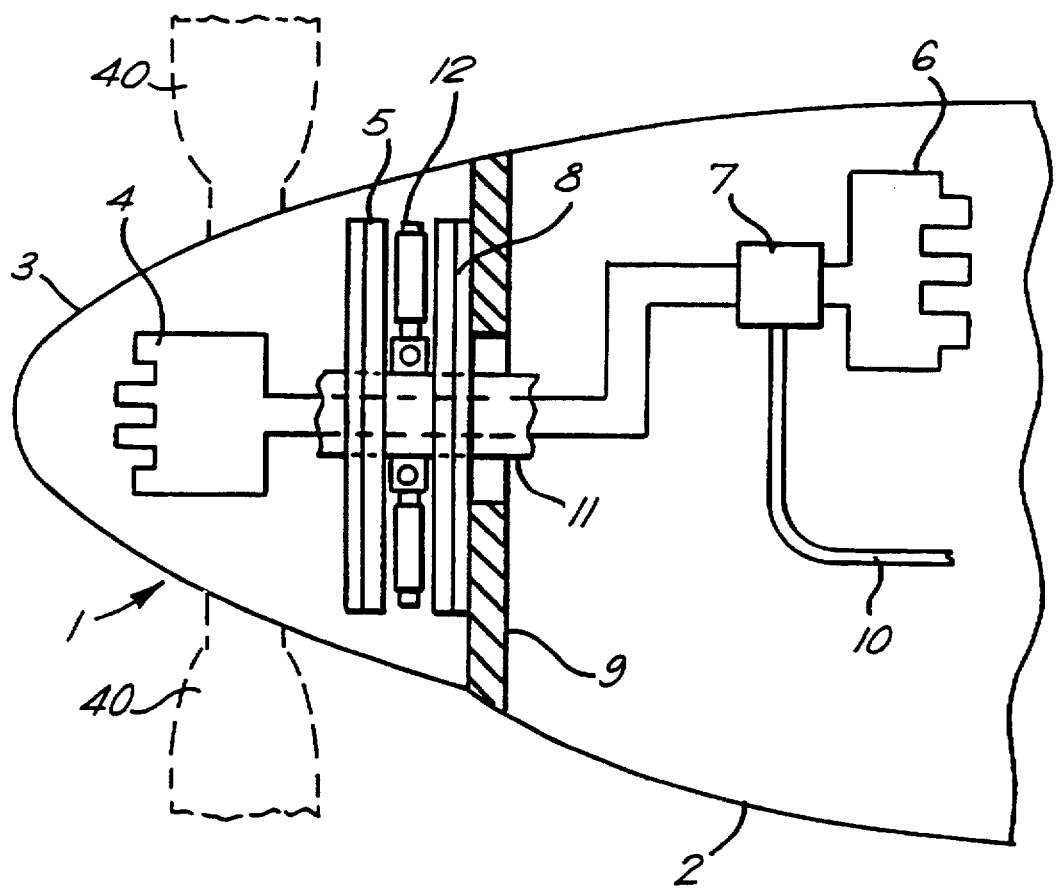
FIG. 1 shows a schematic longitudinal cross-section of a generator in accordance with the invention.

With reference to FIG. 1, a generator 1 is located in an engine nacelle 2 and spinner 3, and is split into two major parts, a stationary part and a relatively moveable part. The moveable part comprises an annular moving winding assembly 5 fixed to the spinner 3 and rotatable therewith relative to the engine nacelle 2. This winding assembly 5 is electrically connected to a set of heating elements 4 which are mounted on the propeller blades 40 on the spinner 3.

The stationary part of the generator 1, comprises an annular stationary winding assembly 8 fixed to a front face plate 9 of the nacelle 2. This winding assembly 8 is electrically connected to airframe de-icing heating elements 6 via a de-icing control unit 7. A data-link 10 connects the de-icing control unit 7 to an airframe computer (not shown). The airframe heating elements 6 are arranged along the leading edge of the aircraft wing (not shown).

An annular magnet assembly 12 is rotatably mounted about a shaft 11 linking the propeller to an engine (not shown) located in the nacelle 2. The magnet assembly 12 is free to rotate about the shaft at a fixed longitudinal position midway between the moving winding assembly 5 and the fixed winding assembly 8.

Figure 2:
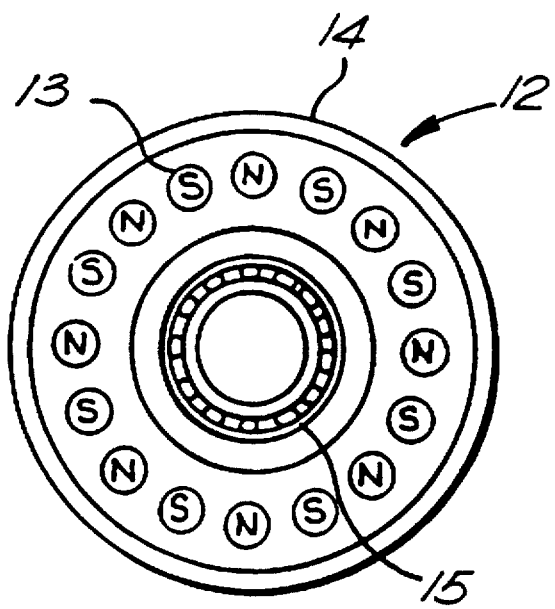
FIG. 2 shows a plan view of a magnet assembly from the generator shown in FIG. 1.

The magnet assembly 12, as clearly shown in FIG. 2, has a plurality of north (N) and south (S) magnetic poles 13 arranged circumferentially about a pole carrier 14. The magnetic material used to form the poles 13 is of the rare earth type which produces a strong magnetic field. About the inner circumference of the magnet assembly 12 is located a ball race 15 to ensure the free rotational movement about the shaft 11.

Figure 3:
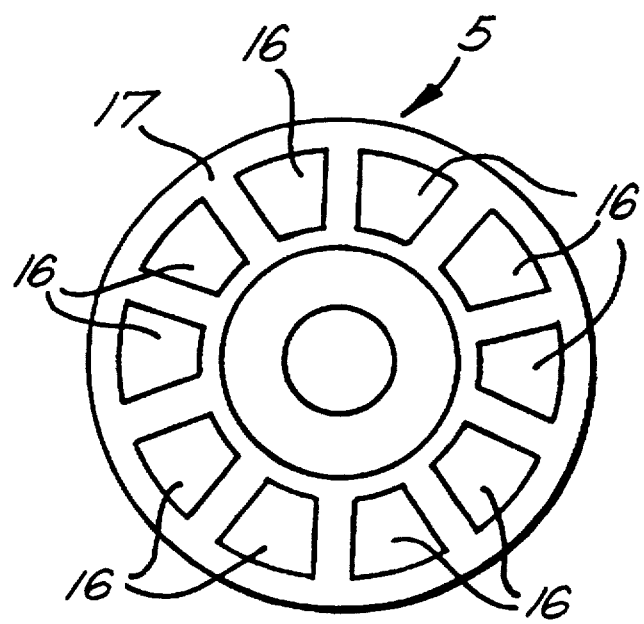
FIG. 3 shows a plan view of a winding assembly from the generator shown in FIG. 1.

The moving winding assembly 5 is shown in greater detail in FIG. 3 and comprises a set of ten printed windings 16 connected in series and fixed to a planar nodynium disc 17. The stationary winding assembly 8 is of a nominally identical construction to that of the moving winding assembly 5.

The windings 16 comprise a plurality of electrically conductive copper tracks fixed to a planar glass reinforced plastics material substrate.

The generator 1 operates in the following manner. In conditions where no ice is forming on the propeller blades or the airframe, the airframe computer instructs the de-icing control unit 7 via the data-link 10 to isolate the airframe heating elements 6 by breaking the electrical connection to the stationary winding 8. The stationary winding 8 is then open circuit and no current is induced. Under these conditions the moving magnet 12 moves in fixed relationship with the spinner 3 because any relative motion between the two results in an induced current in the moving winding assembly producing a field which opposes the relative motion of the moving magnet assembly 12.

If ice starts to form, the airframe computer instructs the de-icing control unit 7 to increase the electrical load on the stationary winding assembly 8 by electrically connecting the assembly to the airframe heater elements 6 so completing the circuit. A current is then induced in the stationary winding assembly 8 by the relative movement of the magnet assembly 12, and the current flows through the airframe heater elements 6 thereby de-icing the airframe.

The current induced in the stationary winding assembly 8 produces an induced magnetic field which opposes the changing field inducing the current. Hence, the induced magnetic field opposes the relative motion of the moving magnet assembly 12 which thus slows down relative to the moving winding assembly 5. The relative motion thus produced, between the moving winding assembly 5 and the moving magnet assembly 12, induces a current in the moving winding assembly 5. This induced current passes through the blade heater elements 4, thereby de-icing the propeller blades.

The de-icing control unit 7 can control the currents flowing through both the airframe heating elements to and the blade heating elements by varying the load on the stationary winding assembly 8.

With a high load, that is, a load equal to the circuit resistance of the airframe heating elements 6, the stationary winding assembly 8 and the de-icing control unit, the induced current is low. The induced field due to the stationary winding assembly 8 is correspondingly low and since this provides the retarding force to the moving magnet 12, the relative motion between this magnet and the moving winding assembly 5 is also low. The current induced in the moving winding assembly 5 is proportional to the rate of change of flux inducing it, which is, of course, dependent upon the relative motion between the moving winding assembly 5 and the moving magnet 12. Hence, under these conditions, the current induced in the moving winding assembly 5 is also low.

To increase the current through the heater elements 4 and 6, the control unit 7 reduces its contribution to the circuit resistance, thereby reducing the load applied to the stationary winding 8. A larger current is induced giving rise to a large induced magnetic field and a greater retardation of the moving magnet 12. This increases the relative motion between the moving magnet 12 and the moving winding assembly 5 increasing the induced current. Hence the currents flowing through both heater elements 4 and 6 are increased.

It is believed that for larger currents to be generated the windings should be wound from wire in preference to forming them by printed tracks.

Figure 4:
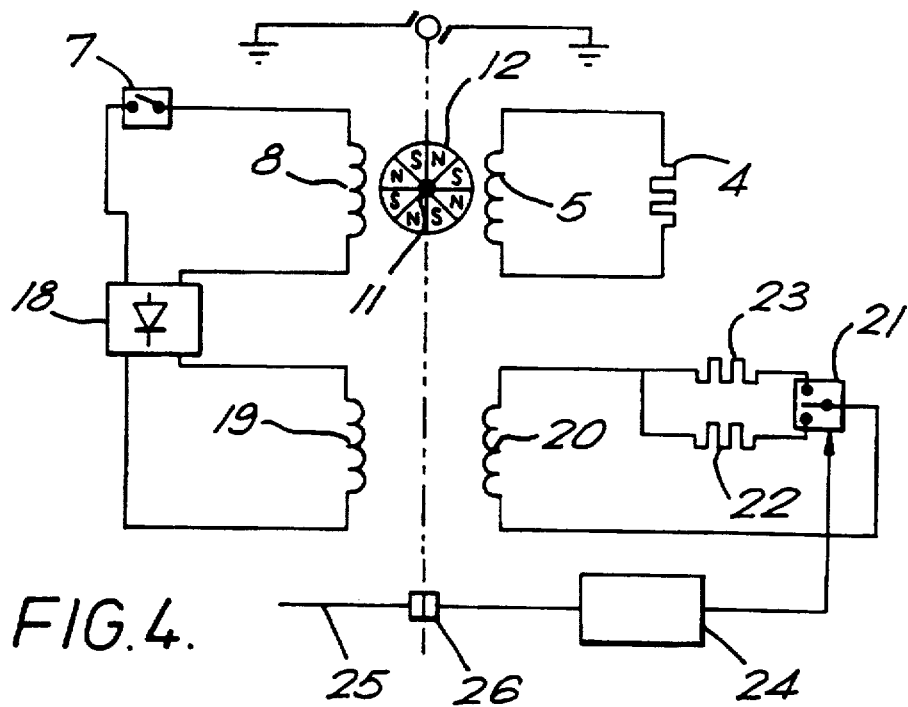
FIG. 4 shows a circuit diagram of an alternative embodiment of the invention.
Figure 5:
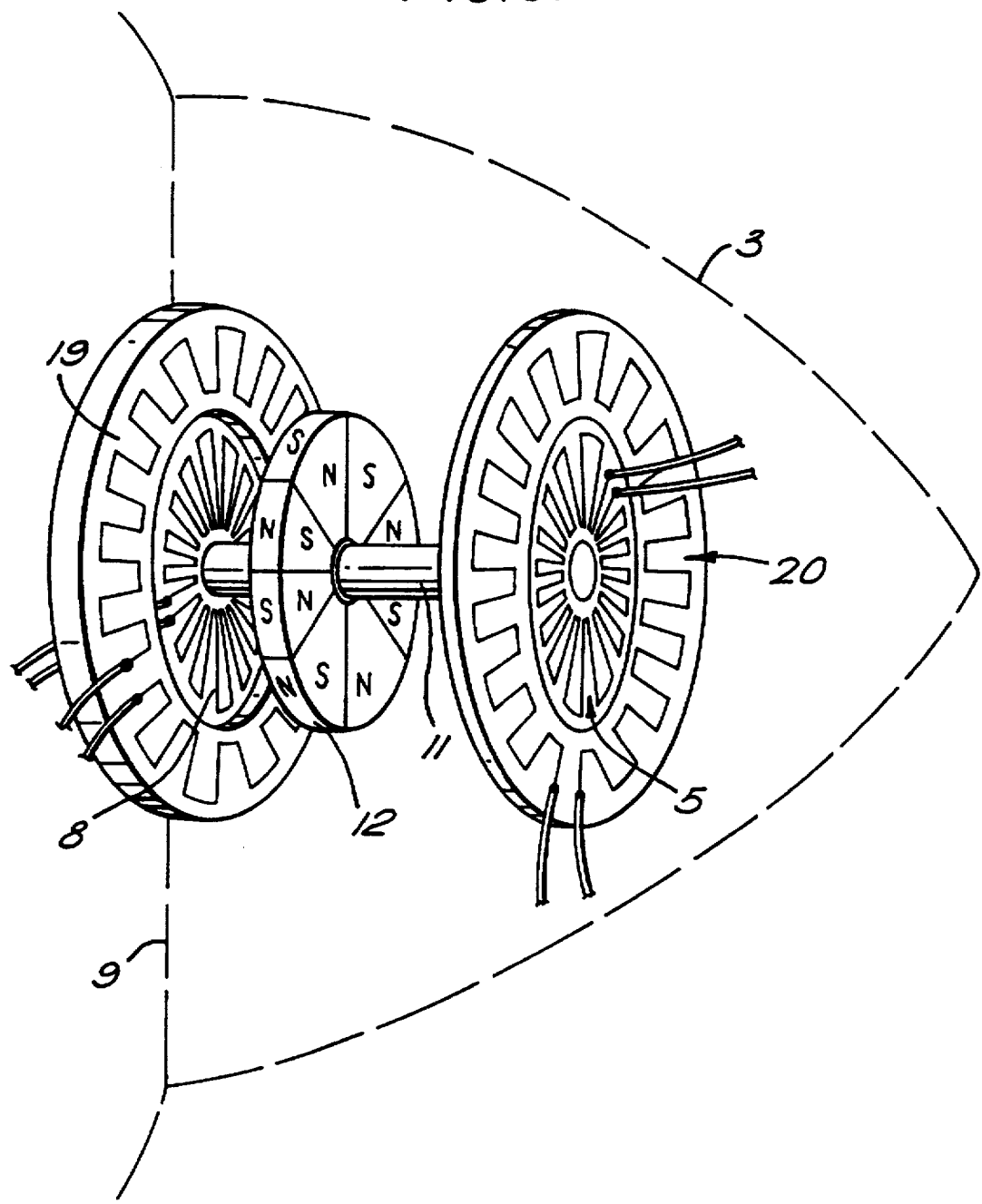
FIG. 5 shows the mechanical layout of the generator of FIG. 4.

An alternative embodiment of the invention is illustrated in FIGS. 4 and 5 which is similar to that of FIG. 1 in comprising an annular moving winding assembly 5 fixed to the spinner 3 of a propeller so as to rotate therewith, an annular magnet assembly 12 rotatably mounted about the drive shaft 11 of the propeller, and a fixed winding assembly 8 connected to the front face plate 9 of the nacelle of the engine driving the propeller. The output of the moving winding assembly 5 is connected to a heating element or elements 4 mounted on the conical leading end of the spinner 3 so as to inhibit or prevent the formation of ice in this region where centrifugal force is of minimum effect in producing a mechanical de-icing action. The output of the fixed winding assembly 8 is connected via an electrical rectifier unit 18 to a further annular winding assembly 19 mounted on the front face plate of the engine nacelle with the fixed winding assembly 8.

A further annular moving winding assembly 20 is mounted on the spinner 3 of the propeller opposite the fixed winding assembly 19 so that the two winding assemblies are inductively coupled and the current flowing in the fixed winding assembly 18 induces a current in the moving winding assembly 20 when the two rotate relative to one another with rotation of the propeller. The output of the further moving winding assembly 20 is connected via a distributor switch 21 to each in succession of heating elements 22,23 mounted on respective blades of the propeller, thereby serving to de-ice the blades.

A switch 7 serves to control operation of the generator by controlling connection of the fixed winding assembly 8 to the further fixed winding assembly 18, and only when the two are connected will the electrical load of the further winding assembly 19 cause the fixed and moving winding assemblies 8 and 5 to suffer a rotary movement or slipping action relative to the permanent magnet assembly 12, so that they each generate an electrical output. The heating elements 4 will then be constantly energised to effect their anti-icing function, and the heating elements 22,23 will be periodically and alternately energised to effect their de-icing function.

The distributor switch 21 serves to connect the output of the moving coil assembly 20 to the respective heating elements 22,23 on the propeller blades under the control of a timer unit 24 with an input control line 25 from the airframe via a rotary connection 26. Typically, a propeller with four blades is fitted with heating elements on the blades connected as two pairs, the heating elements of each pair being mounted on an opposite pair of blades.

Figure 6:
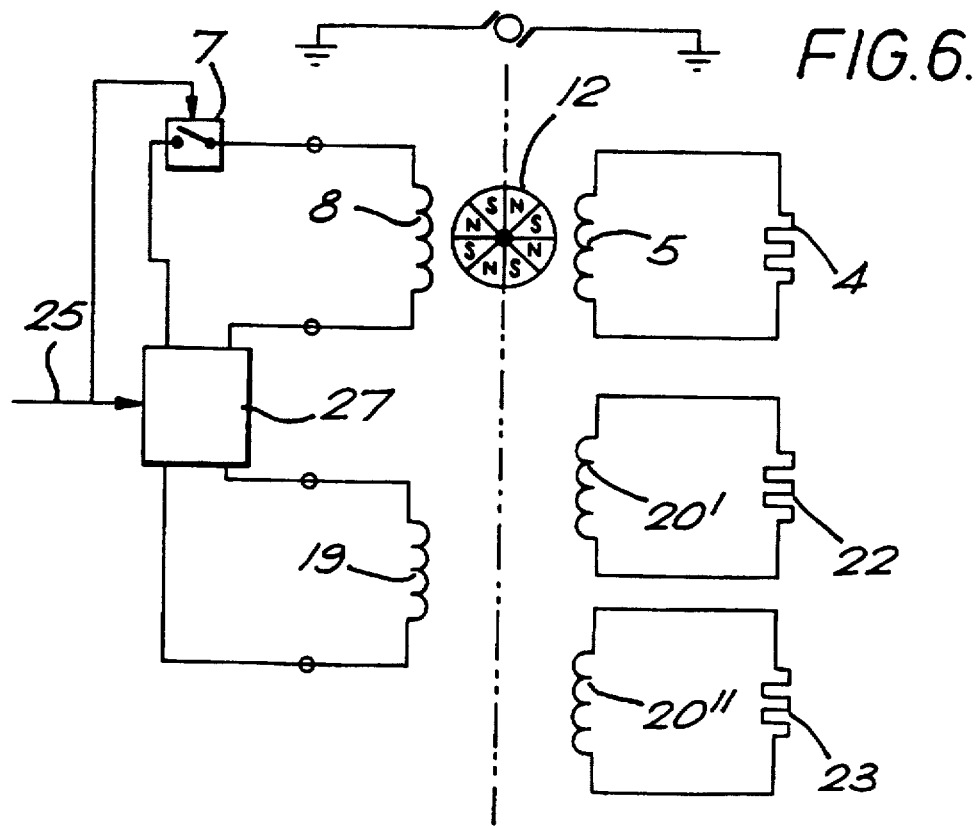
FIG. 6 shows a circuit diagram of another alternative embodiment of the invention.

Yet another embodiment of the invention is illustrated in FIG. 6 which is similar to the embodiment of FIG. 4 in that a further fixed winding assembly 19 is connected to the output of the fixed winding assembly 8 on the front face plate 9 of the engine nacelle and is inductively coupled to a further moving winding assembly 20 on the spinner 3 which has its output connected to propeller blade de-icing elements 22,23. However, instead of providing a distributor switch 21 to switch the output of the moving winding assembly 20 between the heating elements 22,23, the moving winding assembly 20 is formed as two separate moving winding assemblies 20' and 20" each inductively coupled to the fixed winding assembly 19 and each with its output connected to a respective one or a pair of the heating elements 22,23. Each of the heating elements 22,23 is therefore energised separately, and the distribution of power between them is controlled by a power conditioning and synchrophasing control unit 27 connected between the two fixed winding assemblies 8 and 19, which controls the phase of the alternating current flowing in the fixed winding assembly 19 relative to the angular position of the moving winding assemblies 20', 20". The control unit 27 and switch 7 are controlled in turn via a control line 25 from the airframe.

As shown in FIG. 5, the moving winding assemblies 5,20 are fixed concentrically to the propeller drive shaft 11, and the fixed winding assemblies 8,19 are arranged concentrically about the drive shaft 11 and fixed to the front face plate 9 of the engine nacelle 2. The two outer winding assemblies 19,20 are located axially closely together for reasons of efficient inductive coupling, and the permanent magnet assembly 12 is rotatably mounted on the drive shaft 11 between the inner winding assemblies 5, 8 in a space formed by recessing the inner winding assemblies 5,8 relative to the outer winding assemblies 20,19.

Figure 7:
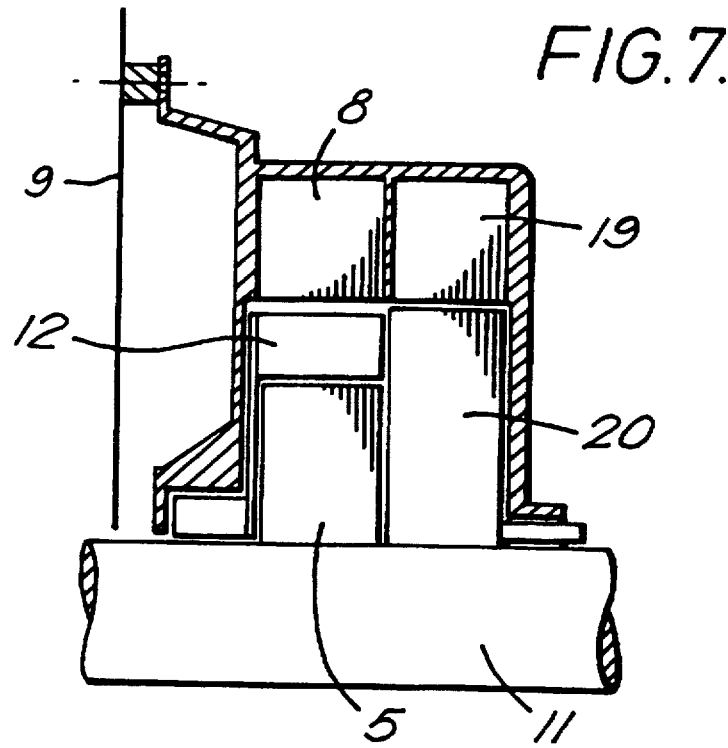
FIG. 7 shows an alternative mechanical layout of the generator of FIG. 4.
Figure 8:
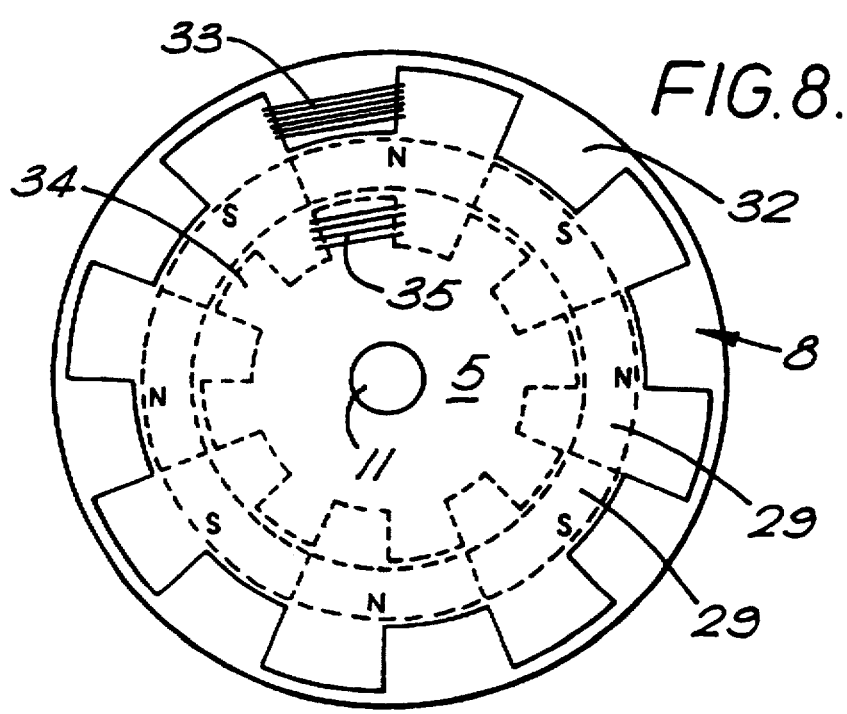
FIG. 8 shows a section through the generator in FIG. 7.

FIG. 7 and 8 show an alternative mechanical layout of the moving winding assemblies 5,20, fixed winding assemblies 8,19, and the permanent magnet assembly 12. The two moving winding assemblies 5,20 are fixed to the propeller drive shaft 11 axially alongside one another within an outer fixed housing 28 connected to the front face plate 9 of the engine nacelle which supports the two fixed winding assemblies 8,19 around the outer periphery of the moving winding assemblies 5,20, respectively. The winding assemblies 19,20 are closely spaced radially for efficient inductive coupling. The winding assemblies 5,8 are spaced apart radially and the permanent magnets 29 of the permanent magnet assembly 12 are mounted in the space therebetween. The permanent magnets 29 are attached to the outer periphery of a support disc 30 which is rotatably supported on the shaft 11 by a bearing 31. The circumferential arrangement of the magnets 29 is shown in FIG. 8.

FIG. 8 also shows the profiles of the laminated cores of the winding assemblies 5 and 8. The moving winding assembly 5 has a core formed with teeth 32 at its outer periphery around which copper wire 33 is wound to form the windings. The moving winding assembly 20 is similar but of larger diameter. Also, the windings of assembly 20 may be all connected in series to give the embodiment of FIG. 4, or connected as two sets of windings 20',20" to give the embodiment of FIG. 6.

The fixed winding assembly 8 has an annular core formed with teeth 34 at its inner periphery around which copper wire 35 is wound to form the windings. The fixed winding assembly 19 is similar to the fixed winding assembly 8.

I claim:

1. An electrical generator for use in a propeller driven vehicle, the generator comprising:

first and second relatively rotatable winding assemblies;

a permanent magnet assembly;

the first winding assembly having a first electrical output for connection to a first electrical load, and in use the first winding assembly and first electrical load being mounted for rotation with the propeller;

the second winding assembly having a second electrical output for connection to a second electrical load; and the permanent magnet assembly being freely rotatably mounted between the winding assemblies, such that, in use, rotation of the winding assemblies relative to each other and to the permanent magnet assembly induces a current in both winding assemblies, whereby a supply of power to the first electrical load is controlled in response to controlling the power supplied to the second electrical load.

2. An electrical generator as in claim 1, in which the second winding assembly and the second electrical load are mounted on the vehicle.

3. An electrical generator as claimed in claim 2 further characterized in that it includes a third winding assembly mounted on the vehicle and connected to the second electrical output, and a fourth winding assembly mounted on the propeller to rotate with the first winding assembly and which is located adjacent to the third winding assembly so that the latter induces a current in the fourth winding assembly, which current is delivered to a fourth electrical load on the propeller.

4. An electrical generator as claimed in claim 3 further characterized in that the fourth electrical load comprises elements associated with the propeller to remove or inhibit the formation of ice on the propeller.

5. An electrical generator as claimed in claim 4 further characterized in that the elements comprising the fourth electrical load are connected to each of at least two blades of the propeller, and the electrical output of the fourth winding assembly is applied to the elements of respective blades in succession.

6. An electrical generator as claimed in claim 5 further characterized in that electrical switching means is provided to connect the electrical output of the fourth winding assembly to the elements.

7. An electrical generator as claimed in claim 5 further characterized in that the fourth winding assembly comprises multiple separate winding assemblies each connected to a respective element and each excited in succession by the third assembly.

8. An electrical generator as in claim 1, in which the first electrical load comprises at least one element associated with the propeller to remove or inhibit the formation of ice thereon.

9. An electrical generator as claimed in claim 8, further characterized in that each element is connected to an associated propeller blade, and the first electrical output is applied to the element of respective blades in succession.

10. An electrical generator as in claim 1, in which the first winding assembly comprises printed electrically conducting tracks on a top and bottom surface of a planar substrate, with ends of the tracks being linked to produce a coil.

11. An electrical generator as in claim 1, further comprising a control unit operatively associated with the second winding assembly and selectively operative to control the power supplied to the second electrical load from the second winding assembly.

12. An electrical generator as claimed in claim 1 further characterized in that the second electrical load comprises at least one element associated with the vehicle body to remove or inhibit the formation of ice on the body.

* * * * *